(12) United States Patent
Panda et al.

(10) Patent No.: US 12,422,416 B2
(45) Date of Patent: Sep. 23, 2025

(54) ESTIMATION OF ALKYL SUBSTITUENT CARBON NUMBER OF AROMATIC COMPOUNDS USING GEL PERMEATION CHROMATOGRAPHY RETENTION TIME AND PREDICTION MODELS

(71) Applicant: Saudi Arabian Oil Company, Dhahran (SA)

(72) Inventors: Saroj Kumar Panda, Dhahran (SA); Mohamed S. Elanany, Jeddah (SA); Abdullah A. Al-Zahrani, Dammam (SA); Hendrik Muller, Al Khobar (SA); Sarafaraz Alam, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 492 days.

(21) Appl. No.: 17/992,324

(22) Filed: Nov. 22, 2022

(65) Prior Publication Data

US 2024/0167987 A1     May 23, 2024

(51) Int. Cl.
| | | |
|---|---|---|
| G01N 30/00 | (2006.01) | |
| G01N 30/46 | (2006.01) | |
| G01N 30/72 | (2006.01) | |
| G01N 30/86 | (2006.01) | |
| G01N 30/02 | (2006.01) | |
| G01N 30/88 | (2006.01) | |

(52) U.S. Cl.
CPC ....... *G01N 30/7206* (2013.01); *G01N 30/461* (2013.01); *G01N 30/8665* (2013.01); *G01N 2030/025* (2013.01); *G01N 2030/8854* (2013.01)

(58) Field of Classification Search
CPC ............. G01N 30/7206; G01N 30/461; G01N 30/8665; G01N 2030/025; G01N 2030/8854; G01N 30/8693; G01N 30/88
USPC .................................................. 250/281, 282
See application file for complete search history.

(56) References Cited

U.S. PATENT DOCUMENTS

| | | |
|---|---|---|
| 5,156,039 A | 10/1992 | Giddings |
| 9,146,213 B2 | 9/2015 | Gorenstein et al. |
| 2009/0179146 A1* | 7/2009 | Lomas ..................... C07K 1/34 204/461 |
| 2019/0033272 A1 | 1/2019 | Mohamad |

FOREIGN PATENT DOCUMENTS

EP    3274721    1/2018

OTHER PUBLICATIONS

Adam et al., "Supercritical fluid chromatography hyphenated with twin comprehensive two-dimensional gas chromatography for ultimate analysis of middle distillates," J. Chromatogr. A, 2010, 1217(8):1386-1394, 9 pages.
Alawani et al., "Characterization of Crude Oils through Alkyl Chain-Based Separation by Gel Permeation Chromatography and Mass Spectrometry," Energy Fuels, 2020, 34(5):5414-5425, 38 pages.

(Continued)

*Primary Examiner* — Michael Maskell
(74) *Attorney, Agent, or Firm* — Fish & Richardson P.C.

(57) ABSTRACT

The disclosure relates to methods to estimate the carbon number of an alkyl substituent (number of carbon atoms in the alkyl substituent) of an aromatic compound using a gel permeation chromatography (GPC) retention time and prediction models.

20 Claims, 10 Drawing Sheets

(56) References Cited

OTHER PUBLICATIONS

Dutriez et al., "High-temperature two-dimensional gas chromatography of hydrocarbons up to nC60 for analysis of vacuum gas oils," J. Chromatogr. A, 2009, 1216(14):2905-2912, 8 pages.

Edam et al., "Comprehensive multi-dimensional chromatographic studies on the separation of saturated hydrocarbon ring structures in petrochemical samples," J. Chromatogr. A 2005, 1086(1-2):12-20, 9 pages.

Gough et al., "Characterization of unresolved complex mixtures of hydrocarbons in petroleum," Nature (London), Apr. 1990, 344:648, 3 pages.

Lozano et al., "Petroleomics: Tools, Challenges, and Developments," Annu Rev Anal Chem (Palo Alto Calif), 2020, 13(1):405-430, 26 pages.

Mahe et al., "Global approach for the selection of high temperature comprehensive two-dimensional gas chromatography experimental conditions and quantitative analysis in regards to sulfur-containing compounds in heavy petroleum cut," J. Chromatogr. A, 2011, 1218(3):534-544, 11 pages.

Marshall et al., "Petroleomics: the next grand challenge for chemical analysis," Acc Chem Res, 2004, 37(1):53-59, 7 pages.

Mullins et al., "Contrasting Perspective on Asphaltene Molecular Weight. This Comment vs the Overview of A. A. Herod, K. D. Bartle, and R. Kandiyoti," Energy Fuels, 2008, 22(6):4312-4317, 9 pages.

Panda et al., "Characterization of aromatic hydrocarbons and sulfur heterocycles in Saudi Arabian heavy crude oil by gel permeation chromatography and ultrahigh resolution mass spectrometry," Fuel, 2019, 235:1420-1426, 7 pages.

Panda et al., "Characterization of supercomplex crude oil mixtures: what is really in there?" Angew. Chem., Int. Ed., 2009, 121:1820-1823, 4 pages.

Panda et al., "Mass-spectrometric analysis of complex volatile and nonvolatile crude oil components: A challenge," Anal. Bioanal. Chem., 2007, 389(5):1329-1339, 11 pages.

Panda et al., "Size exclusion chromatography of aromatic compounds in high-boiling petroleum samples," J. Chromatogr. A, 2021, 1657:462510, 30 pages.

Panda et al., "Size exclusion chromatography of petroleum samples using amino-bonded silica phase," Fuel, 2021, 302:120914, 7 pages.

Scikit-learn.org [online], "Metrics and scoring: quantifying the quality of predictions," available on or before 2007, retrieved Apr. 6, 2023, retrieved from URL <https://scikit-learn.org/stable/modules/model_evaluation.html#r2-score>, 31 pages.

Striebich et al., "Hydrocarbon Group-Type Analysis of Petroleum-Derived and Synthetic Fuels Using Two-Dimensional Gas Chromatography," Energy Fuels, 2014, 28(9):5696-5706, 11 pages.

Van der Westhuizen et al., "Comprehensive two-dimensional gas chromatography for the analysis of Fischer-Tropsch oil products," J. Chromatogr. A, 2010, 1217(52):8334-8339, 26 pages.

Van Geem et al., "On-line analysis of complex hydrocarbon mixtures using comprehensive two-dimensional gas chromatography," J. Chromatogr. A, 2010, 1217(43):6623-6633, 11 pages.

Vanini et al., "Characterization of nonvolatile polar compounds from Brazilian oils by electrospray ionization with FT-ICR MS and Orbitrap-MS," Fuel, 2020, 282:118790, 13 pages.

Venkatramani et al., "Comprehensive two-dimensional gas chromatography applied to the analysis of complex mixtures," J. Microcolumn, Sep. 1993, 5(6):511, 6 pages.

* cited by examiner

ESTIMATION OF ALKYL SUBSTITUENT CARBON NUMBER OF AROMATIC COMPOUNDS USING GEL PERMEATION CHROMATOGRAPHY RETENTION TIME AND PREDICTION MODELS

FIELD

The disclosure relates to methods to estimate the carbon number of an alkyl substituent (number of carbon atoms in the alkyl substituent) of an aromatic compound using a gel permeation chromatography (GPC) retention time and prediction models.

BACKGROUND

The carbon number of an alkyl substituent of an aromatic compound can be estimated using high-resolution mass spectrometry; however, in general, the equipment for mass spectrometry can be expensive and limited in availability.

Gas chromatography can be used to characterize a hydrocarbon sample (e.g., crude oil); however, often, a large portion of high-boiling and non-boiling compounds are not detected in gas chromatography.

SUMMARY

The disclosure relates to methods to estimate the carbon number of an alkyl substituent of an aromatic compound using a GPC retention time and prediction models.

The methods include size exclusion chromatography (e.g., SEC or Gel Permeation Chromatography (GPC)), which is capable of measuring low-boiling and high-boiling components in a hydrocarbon sample. The methods can include the use of a UV detector with the size exclusion chromatography, which allows for the selective detection of aromatic compounds in a sample that includes non-aromatic compounds. The methods can be relatively simple and inexpensive to set up and perform.

The methods can be integrated with commercially available high performance liquid chromatography ("HPLC") equipment. The prediction models of the disclosure can be integrated with HPLC software and/or data generated from the HPLC software can be processed using the methods of the disclosure.

The methods can be used in various applications, such as characterizing refinery streams, monitoring the progress of cracking reactions (e.g., thermal and/or catalytic cracking), and/or determining trends in the compositions of petroleum samples.

In a first aspect, the disclosure provides a method of determining a carbon number of an alkyl substituent of an aromatic compound. The method includes: using chromatography to measure a retention time of the aromatic compound; determining a physical parameter of the aromatic compound using the measured retention time of the aromatic compound and a first prediction model; and determining a carbon number for the alkyl substituent of the aromatic compound using the physical parameter of the aromatic compound and a second prediction model. The first prediction model includes a calibration curve of the physical parameter as a function of retention time or a parameter derived from the retention time. The second prediction model includes a calibration curve of the carbon number of the alkyl substituent as a function of the physical parameter.

In some embodiments, the physical parameter includes a molecular length of the aromatic compound, the first prediction model includes a calibration curve of the molecular length as a function of retention time, and the second prediction model includes a calibration curve of the carbon number for the alkyl substituent as a function of molecular length.

In some embodiments, the physical parameter includes a molecular volume of the aromatic compound, the first prediction model includes a calibration curve of molecular volume as a function of retention time and the second prediction model includes a calibration curve of the carbon number for the alkyl substituent as a function of molecular volume.

In some embodiments, the aromatic compound has a retention volume ($R_v$) calculated as:

$$R_v = R_t \times \text{flow rate a of mobile phase used in the chromatography;}$$

wherein $R_t$ is the retention time of the aromatic compound. The physical parameter includes a molecular length of the aromatic compound. The first prediction model includes a calibration curve of the molecular length as a function of retention volume. The second prediction model includes a calibration curve of the carbon number for the alkyl substituent as a function of molecular length.

In some embodiments, the aromatic compound has a retention volume ($R_v$) calculated as:

$$R_v = R_t \times \text{flow rate of a mobile phase used in the chromatography;}$$

wherein $R_t$ is the retention time of the aromatic compound. The physical parameter includes a molecular volume of the aromatic compound. The first prediction model includes a calibration curve of the molecular volume as a function of retention volume. The second prediction model includes a calibration curve of the carbon number for the alkyl substituent as a function of molecular volume.

In some embodiments, the aromatic compound has a solute distribution coefficient (Kais) calculated as:

$$K_{Dis} = \frac{\text{Retention volume of aromatic compound} - \text{elution volume of a high MW polystyrene standard}}{\text{Retention volume of benzene} - \text{elution volume of a high MW polystyrene standard}}.$$

The physical parameter includes a molecular length of the aromatic compound. The first prediction model includes a calibration curve of the molecular length as a function of solute distribution coefficient. The second prediction model includes a calibration curve of the carbon number for the alkyl substituent as a function of molecular length.

In some embodiments, the aromatic compound has a solute distribution coefficient (Kais) calculated as:

$$K_{Dis} = \frac{\text{Retention volume of aromatic compound} - \text{elution volume of a high MW polystyrene standard}}{\text{Retention volume of benzene} - \text{elution volume of a high MW polystyrene standard}}.$$

The physical parameter includes a molecular volume of the aromatic compound. The first prediction model includes a calibration curve of the molecular volume as a function of solute distribution coefficient. The second prediction model includes a calibration curve of the carbon number for the alkyl substituent as a function of molecular volume.

In some embodiments, the first prediction model is constructed by measuring retention times of standard aromatic compounds and calculating the physical parameter for the standard aromatic compounds.

In some embodiments, the carbon number for the alkyl substituent of the aromatic compound includes an alkyl carbon number distribution, a highest alkyl carbon number, and/or an alkyl carbon number of highest abundance.

In some embodiments, the retention time is measured using size exclusion chromatography.

In some embodiments, the physical parameter is measured by molecular modeling.

In some embodiments, the aromatic compound includes an aromatic compound with one ring, an aromatic compound with two rings, an aromatic compound with three rings, and/or an aromatic compound with more than three rings.

In some embodiments, the aromatic compound is derived from naphtha, gas oil, vacuum gas oil, residue, crude oil, cracking products, and/or a petroleum sample.

In some embodiments, the disclosure provides one or more machine-readable hardware storage devices including instructions that are executable by one or more processing devices to perform operations including one or more methods of the disclosure.

In some embodiment, the disclosure provides a system including one or more processing devices and one or more machine-readable hardware storage devices including instructions that are executable by the one or more processing devices to perform operations including one or more methods of the disclosure.

In a second aspect, the disclosure provides a method of determining a carbon number of an alkyl substituent of an aromatic compound. The method includes using chromatography to measure a retention time of the aromatic compound, and determining a carbon number for the alkyl substituent of the aromatic compound using the measured retention time for the aromatic compound and a prediction model. The prediction model includes a calibration curve of the carbon number of the alkyl substituent as a function of the retention time or a parameter derived from the retention time.

In certain embodiments, the carbon number for the alkyl substituent of the aromatic compound includes an alkyl carbon number distribution, a highest alkyl carbon number, and/or an alkyl carbon number of highest abundance.

In certain embodiments, the aromatic compound includes an aromatic compound with one ring, an aromatic compound with two rings, an aromatic compound with three rings, and/or an aromatic compound with more than three rings.

In certain embodiments, the aromatic compound is derived from naphtha, gas oil, vacuum gas oil, residue, crude oil, cracking products, and/or a petroleum sample.

In certain embodiments, the disclosure provides one or more machine-readable hardware storage devices including instructions that are executable by one or more processing devices to perform operations including one or more methods of the disclosure.

In certain embodiments, the disclosure provides a system including one or more processing devices, and one or more machine-readable hardware storage devices including instructions that are executable by the one or more processing devices to perform operations including one or more methods of the disclosure.

DETAILED DESCRIPTION

Figure 1:
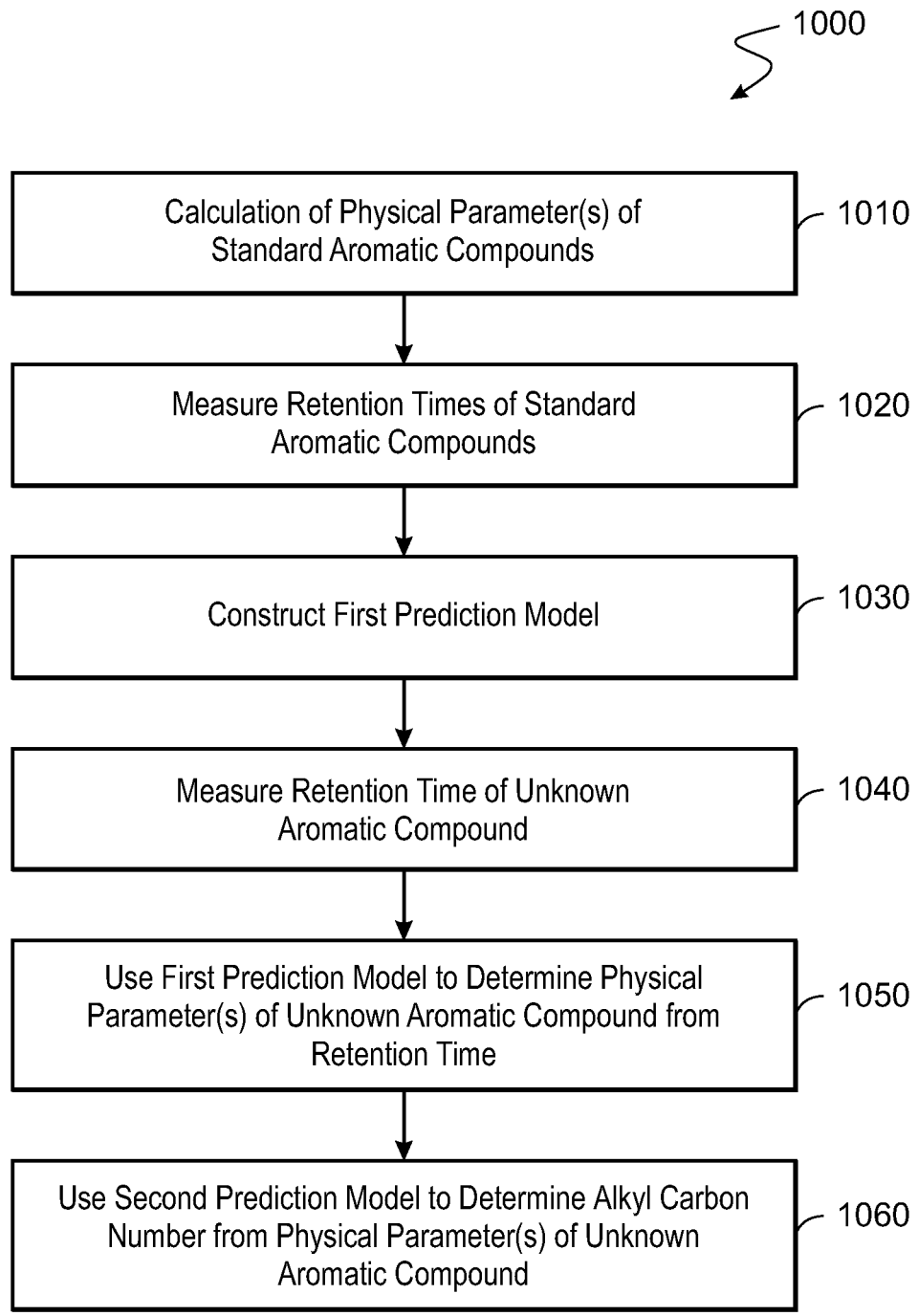
FIG. 1 depicts a flow chart for a method.

FIG. 1 depicts a flow chart of steps in a method 1000 that provides the carbon number of an alkyl substituent (alkyl carbon number) of an aromatic compound using a retention time (e.g., a GPC retention time) of the aromatic compound and prediction models.

In step 1010, one or more physical parameters, such as molecular length (Lm) and/or molecular volume (Vm), for standard aromatic compounds are calculated using molecular modeling. As used herein, the molecular length of a molecule is the maximum distance between terminal atoms in the molecule, with units in Angstroms (Å). As used herein, the molecular volume of a molecule is the volume occupied by all atoms of a molecule and directly relates to the Van der Waals radius, with units in $Å^3$. Examples of standard aromatic compounds include aromatic compounds with an alkyl substituent of varying length. In some embodiments, molecular modeling in step 1010 includes using density functional theory, molecular mechanics, semiempirical, molecular dynamics, and/or hybrid molecular mechanics-quantum mechanics.

In step 1020, the retention time ($R_t$) for each of the standard aromatic compounds is measured by size exclusion chromatography (e.g., aromatic-selective size exclusion chromatography, gel permeation chromatography, aromatic-selective gel permeation chromatography) (see discussion below). In general, any size exclusion chromatography with detection selective for aromatic compounds to reduce (e.g., prevent) interference from non-aromatic compounds can be used in the step 1020.

Figure 2:
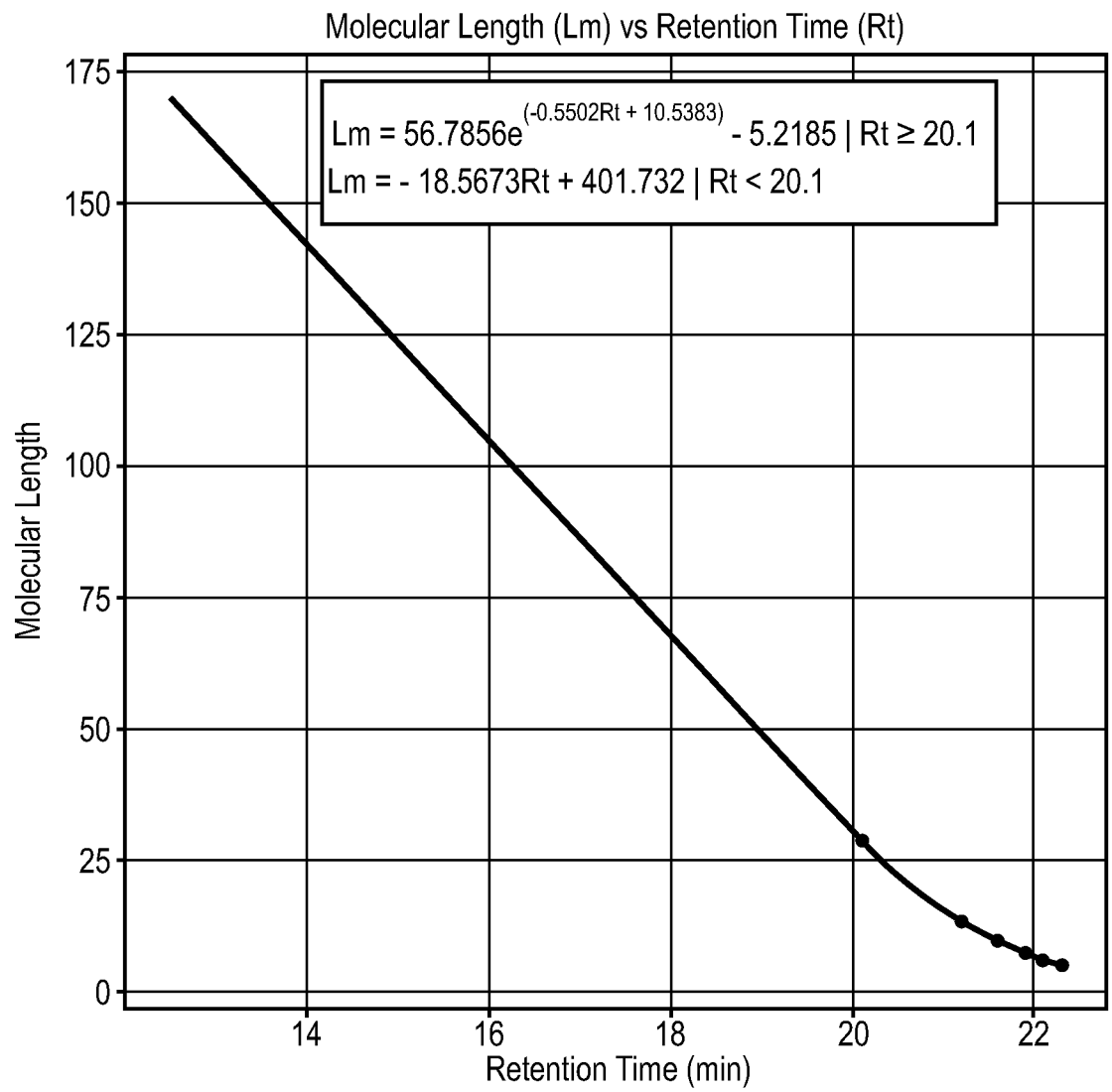
FIG. 2 depicts a plot of molecular length as a function of retention time.
Figure 3:
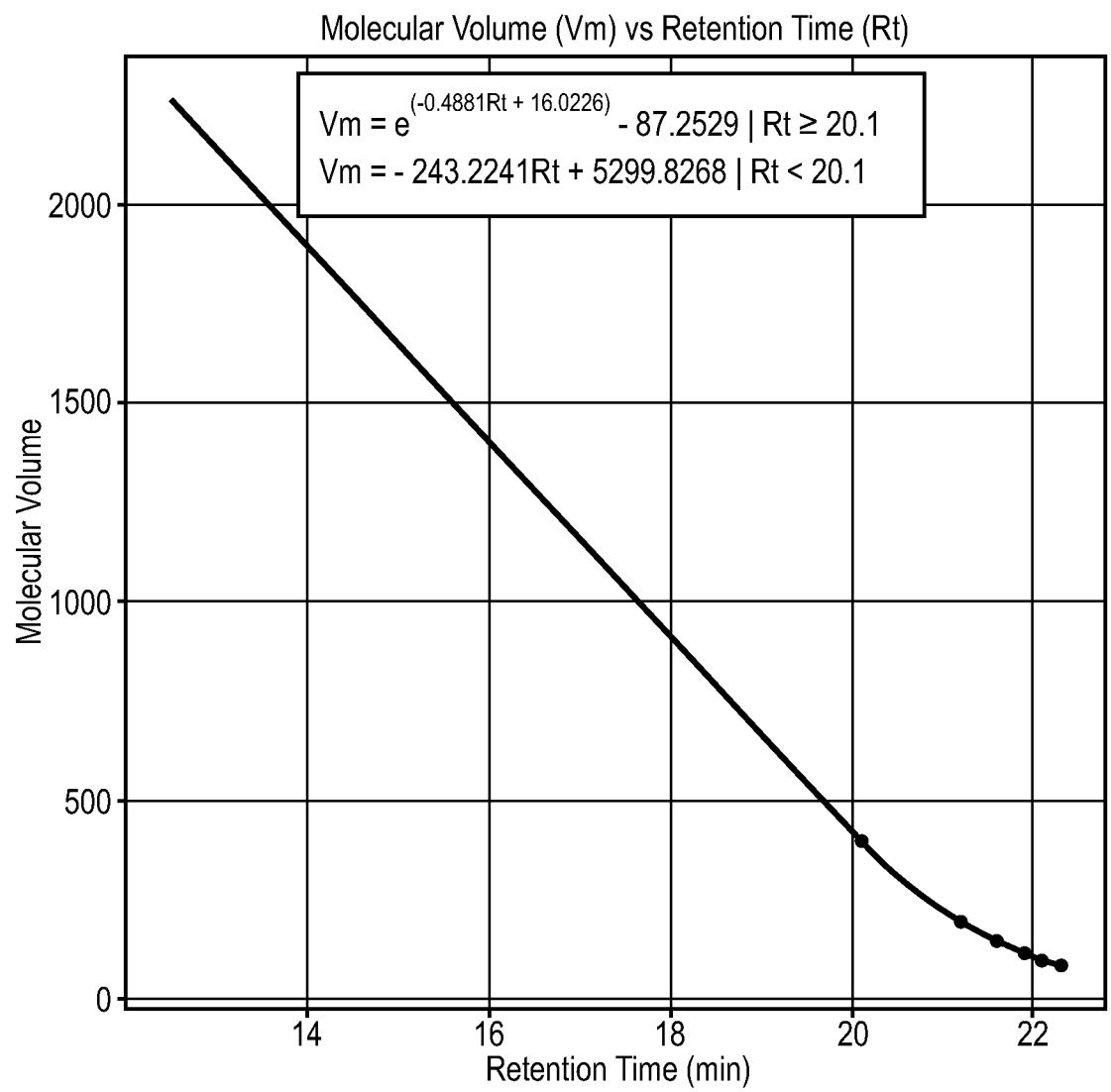
FIG. 3 depicts a plot of molecular volume as a function of retention time.

In step 1030, a first prediction model is constructed using the retention times from step 1020 and the physical parameters from step 1010, as discussed in more detail below. The prediction model generally includes a calibration curve of the physical parameter (obtained from step 1010) as a function of retention time (obtained from step 1020) with an appropriate fit of the data. For example, in some embodiments, the physical parameter is the molecular length and the first prediction model is a calibration curve of molecular length as a function of retention time. Such a model is depicted in FIG. 2, which is described in more detail below. As another example, in some embodiments, the physical parameter is the molecular volume and the first prediction model is a calibration curve of molecular volume as a function of retention time. Such a model is depicted in FIG. 3, which is described in more detail below.

In step 1040, the retention time of an unknown aromatic compound is measured by size exclusion chromatography (see discussion below).

In step 1050, the retention time of the unknown sample measured in step 1040 and the first prediction model from step 1030 are used to determine a physical parameter for the unknown aromatic compound. For example, in certain embodiments, the first prediction model is a calibration curve of molecular length as a function of retention time (as depicted in FIG. 2) and a molecular length of the unknown aromatic compound is determined from the first prediction model. As another example, in certain embodiments, the first prediction model is a calibration curve of molecular volume as a function of retention time (as depicted in FIG. 3) and a molecular volume of the unknown aromatic compound is determined from the first prediction model.

Figure 4:
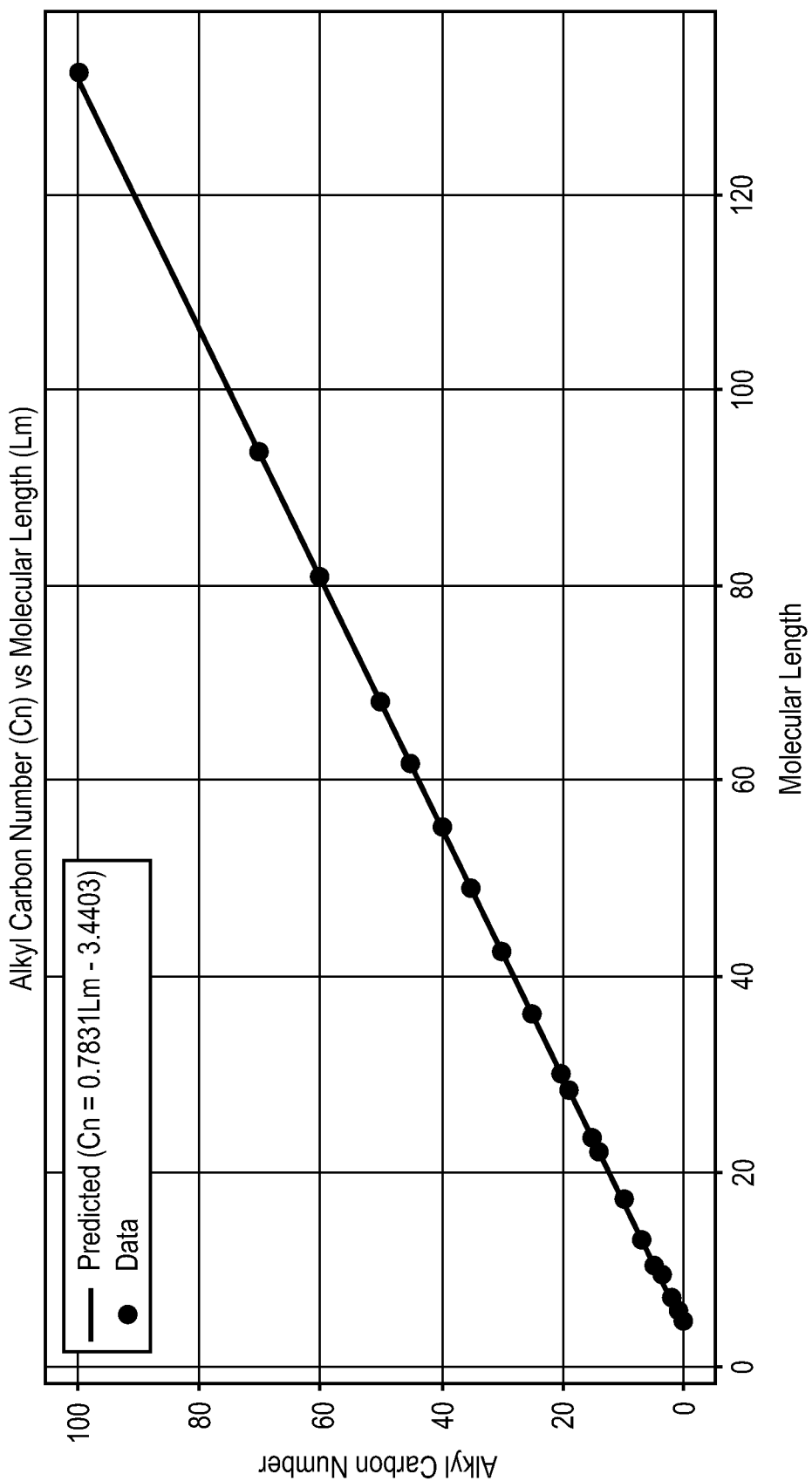
FIG. 4. depicts a plot of carbon number of an alkyl substituent as a function of molecular length.
Figure 5:
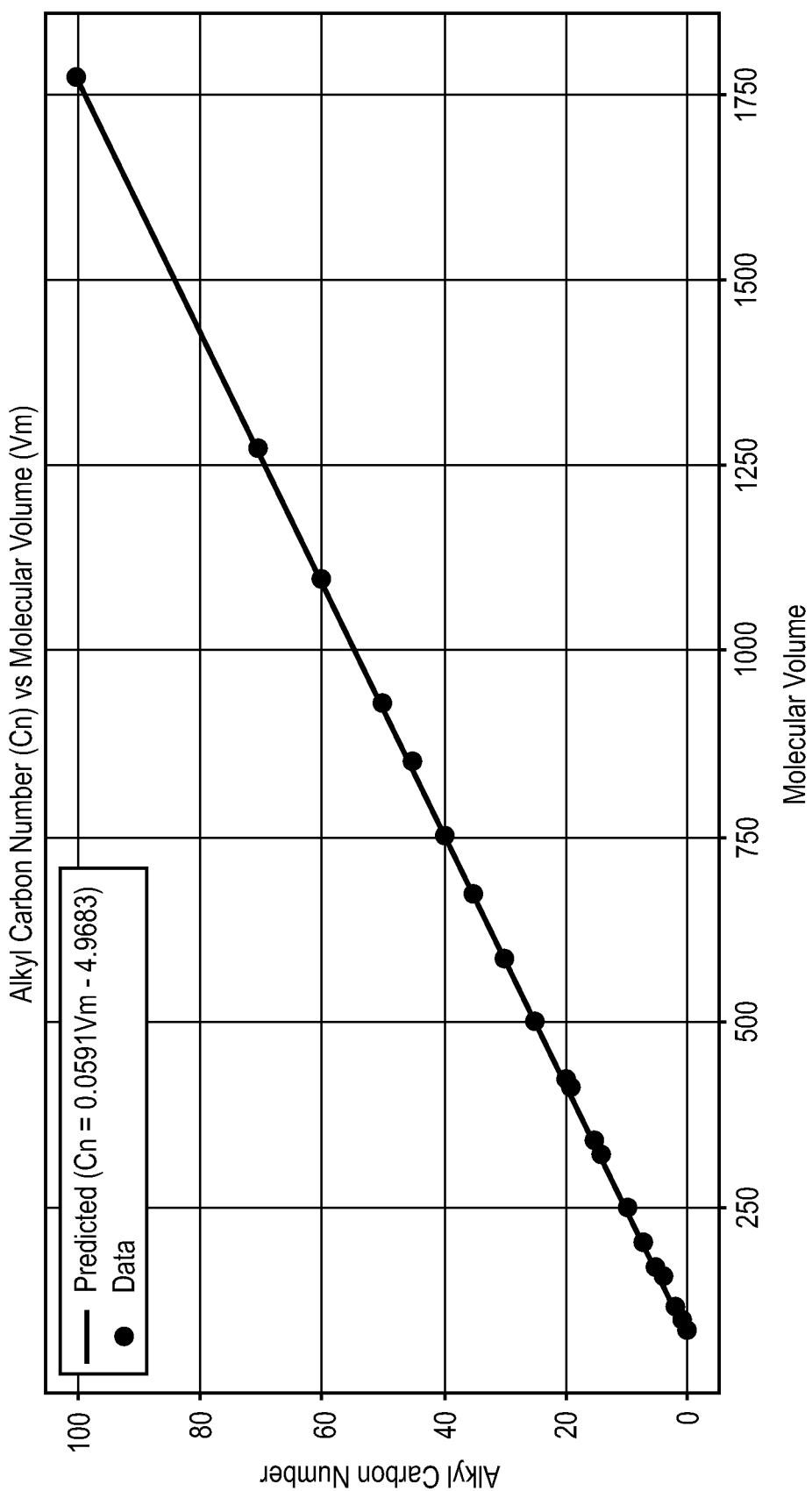
FIG. 5. depicts a plot of carbon number of an alkyl substituent as a function of molecular volume.

As described in more detail below, in step 1060, a second prediction model is used to determine a carbon number of the alkyl substituent of the unknown aromatic compound from the physical parameter of the unknown aromatic compound determined in step 1050. The second prediction model generally includes a calibration curve of the carbon number of the alkyl substituent (alkyl carbon number) as a function of the physical parameter with an appropriate fit of the data. For example, in some embodiments, a molecular length of the unknown aromatic compound is determined in step 1050 and the second prediction model is a calibration curve of carbon number of the alkyl substituent (alkyl carbon number) as a function of molecular length. Such a model is depicted in FIG. 4, which is described in more detail below. As another example, in some embodiments, a molecular volume of the unknown aromatic compound is determined in step 1050 and the second prediction model is a calibration curve of carbon number of the alkyl substituent (alkyl carbon number) as a function of molecular volume. Such a model is depicted in FIG. 5, which is described in more detail below.

The second prediction model of step 1060 can be constructed by calculating a physical parameter, such as the molecular length or molecular volume, of a series of aromatic compounds with an alkyl substituent of varying length using molecular modeling. In some embodiments, the molecular modeling includes density functional theory, molecular mechanics, semiempirical, molecular dynamics, and/or hybrid molecular mechanics-quantum mechanics. In some embodiments, the molecular modeling used to construct the second prediction model includes the molecular modeling of step 1010.

The standard aromatic compounds referred to in steps 1010 and 1020 include aromatic compounds with alkyl substituents of varying carbon number. In some embodiments, the lowest carbon number of the alkyl substituent of the aromatic compounds of steps 1010 and 1020 is at least 1 (e.g., at least 2, at least 3) and/or the largest carbon number of the alkyl substituent of the aromatic compounds of steps 1010 and 1020 is at most 19 (e.g., at most 18, at most 17, at most 16, at most 15). In some embodiments, the number of standard aromatic compounds is at least 6 (e.g., at least 7, at least 8, at least 9, at least 10).

The series of aromatic compounds referred to in step 1060 include aromatic compounds with alkyl substituents of varying carbon number. The series of aromatic compounds of step 1060 can be the same or different as the standard aromatic compounds from steps 1010 and 1020. In some embodiments, the lowest carbon number of the alkyl substituent of the aromatic compounds of step 1060 is at least 1 (e.g., at least 2, at least 3, at least 4, at least 5, at least 10) and/or the largest carbon number of the alkyl substituent of the aromatic compounds of step 1060 is at most 100 (e.g., at most 90, at most 80, at most 70, at most 60, at most 50, at most 40, at most 30, at most 20, at most 10). In some embodiments, the number of compounds used in step 1060 is at least 1 (e.g., at least 2, at least 3, at least 4, at least 5).

In steps 1020 and 1040, the measurement of retention time includes the separation of aromatic compounds based on carbon number of the alkyl substituent followed by detection of aromatic compounds using a UV detector. This separation and measurement provides a distribution of aromatic compounds based on the carbon number of the alkyl substituent. Without wishing to be bound by theory, it is believed that a number of rings in an aromatic compound (e.g., one ring, two rings, three rings) does not significantly impact the retention time. The retention time of a compound mainly depends on the polarity and the size of the compound. The polarity of the alkylated aromatic compounds does not significantly vary for alkyl chains longer than $C_1$. Furthermore, an alkyl group on an aromatic compound significantly influences the retention behavior of the aromatic compound. For example, toluene, methyl naphthalene and methyl phenanthrene elute at similar retention time intervals.

Size exclusion chromatography generally includes a stationary phase and a mobile phase that separates molecules based on their size. The stationary phase is typically a porous solid packed into a column and the mobile phase flows through the packed column. In steps 1020 and 1040, the stationary phase and mobile phase of the size exclusion chromatography method are selected as appropriate. Examples of the stationary phase include amino-bonded silica phase, polystyrene-divinylbenzene, diol-bonded silica and cyano-bonded silica. Examples of the mobile phase include dichloromethane, a solvent with a similar polarity to dichloromethane, dichloroethane, di-ethyl ether, methyl-t-butyl-ether, n-propanol, iso-propanol and tetrahydrofuran. In some embodiments, a column of relatively high pore size (e.g., >100 Å) can be used for samples with a relatively high carbon number of the alkyl substituent (e.g., at least 100).

The method 1000 can further include calculating a parameter derived from the retention time to represent the liquid chromatography peak retention, such as a retention volume, a retention factor or a solute distribution coefficient.

In some embodiments, the method 1000 includes calculating a retention volume ($R_v$) for the standard and unknown aromatic compounds as $$R_v = R_t \times \text{flow rate of mobile phase} \qquad (1)$$

where $R_t$ is the retention time. The first prediction model constructed in step 1030 would include the retention volume rather than the retention time. The prediction model would therefore be a calibration curve of molecular length as a function of retention volume or molecular volume as a function of retention volume. In some embodiments, the flow rate of the mobile phase is at least 0.2 (e.g., at least 0.3, at least 0.4, at least 0.5, at least 0.6, at least 0.7, at least 0.8) mL/min and/or at most 1 (e.g., at most 0.9, at most 0.8) mL/min. In some embodiments, the flow rate of the mobile phase is 0.8 mL/min.

In certain embodiments, the method 1000 includes the calculation of the retention factor (k') as $$k' = \frac{R_t - R_0}{R_t} \quad (2)$$

where Rt is the retention time and $R_0$ is the retention time of an unretained compound (e.g., a compound similar to the mobile phase). The first prediction model constructed in step 1030 would include the retention factor rather than the retention time. The prediction model would therefore be a calibration curve of molecular length as a function of retention factor or molecular volume as a function of retention factor.

In some embodiments, the method includes the calculation of a solute distribution coefficient ($K_{Dis}$) as $$K_{Dis} = \frac{\text{Retention volume of aromatic compound } - \text{elution volume of a high MW polystyrene standard}}{\text{Retention volume of benzene } - \text{elution volume of a high MW polystyrene standard}}. \quad (3)$$

The first prediction model constructed in step 1030 would include the solute distribution coefficient rather than the retention time. The prediction model would therefore be a calibration curve of molecular length as a function of solute distribution coefficient or molecular volume as a function of solute distribution coefficient. Examples of the high molecular weight polystyrene standard include polystyrene with a molecular weight of at least 100,000 g/mol.

Without wishing to be bound by theory, it is believed that the retention time may be more sensitive to the experimental conditions relative to the retention volume, retention factor and/or solute distribution coefficient. The retention volume can account for differences in the flow rate, the retention factor can account for differences in the column size and instrumental dead volume, and the solute distribution coefficient can account for differences in the stationary phase loading and can describe the retention characteristics of different organic compounds.

In some embodiments, multiple first and second prediction models can be constructed to validate the results of the method 1000. For example, a first implementation of the method 1000 can include a first prediction model that includes a calibration curve of molecular length as a function of retention time (as shown in FIG. 2) and a second prediction model that includes a calibration curve of carbon number of an alkyl substituent (alkyl carbon number) as a function of molecular length (as shown in FIG. 4); and a second implementation of the method 1000 can include a first prediction model that includes a calibration curve of molecular volume as a function of retention time (as shown in FIG. 3) and a second prediction model that includes a calibration curve of carbon number of an alkyl substituent (alkyl carbon number) as a function of molecular volume (as shown in FIG. 5).

Figure 6:
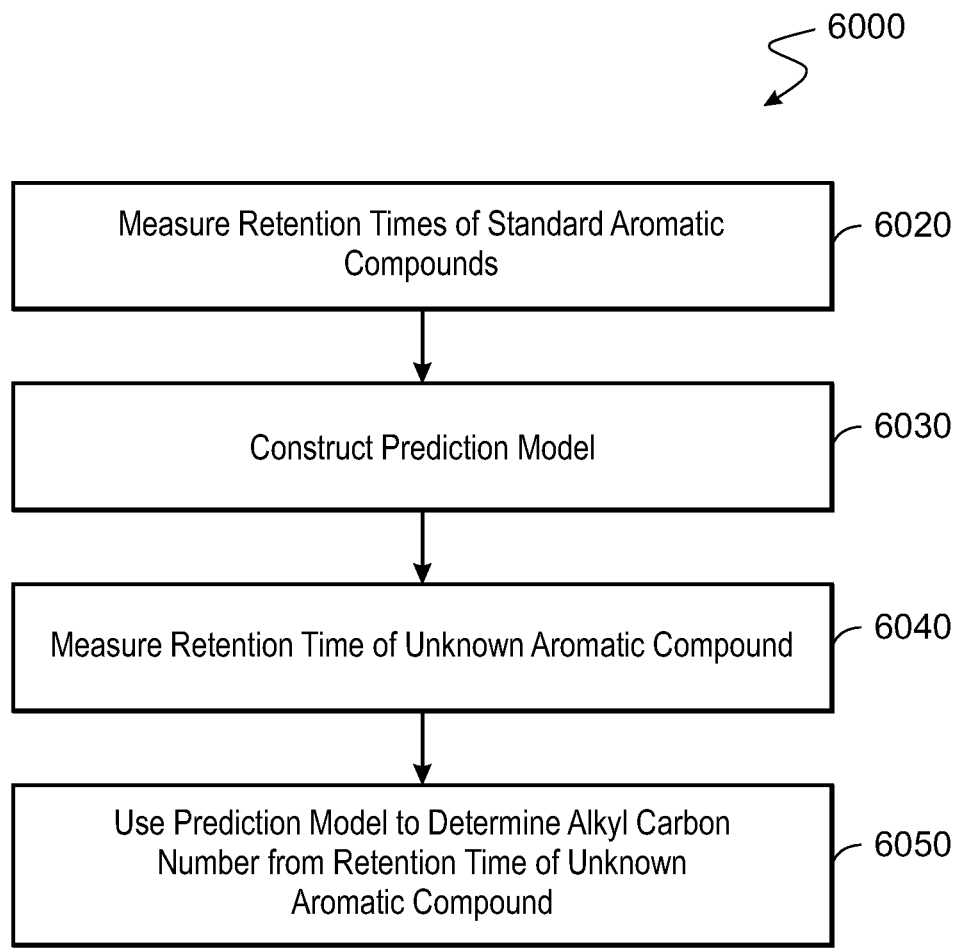
FIG. 6 depicts a flow chart for a method.
Figure 7:
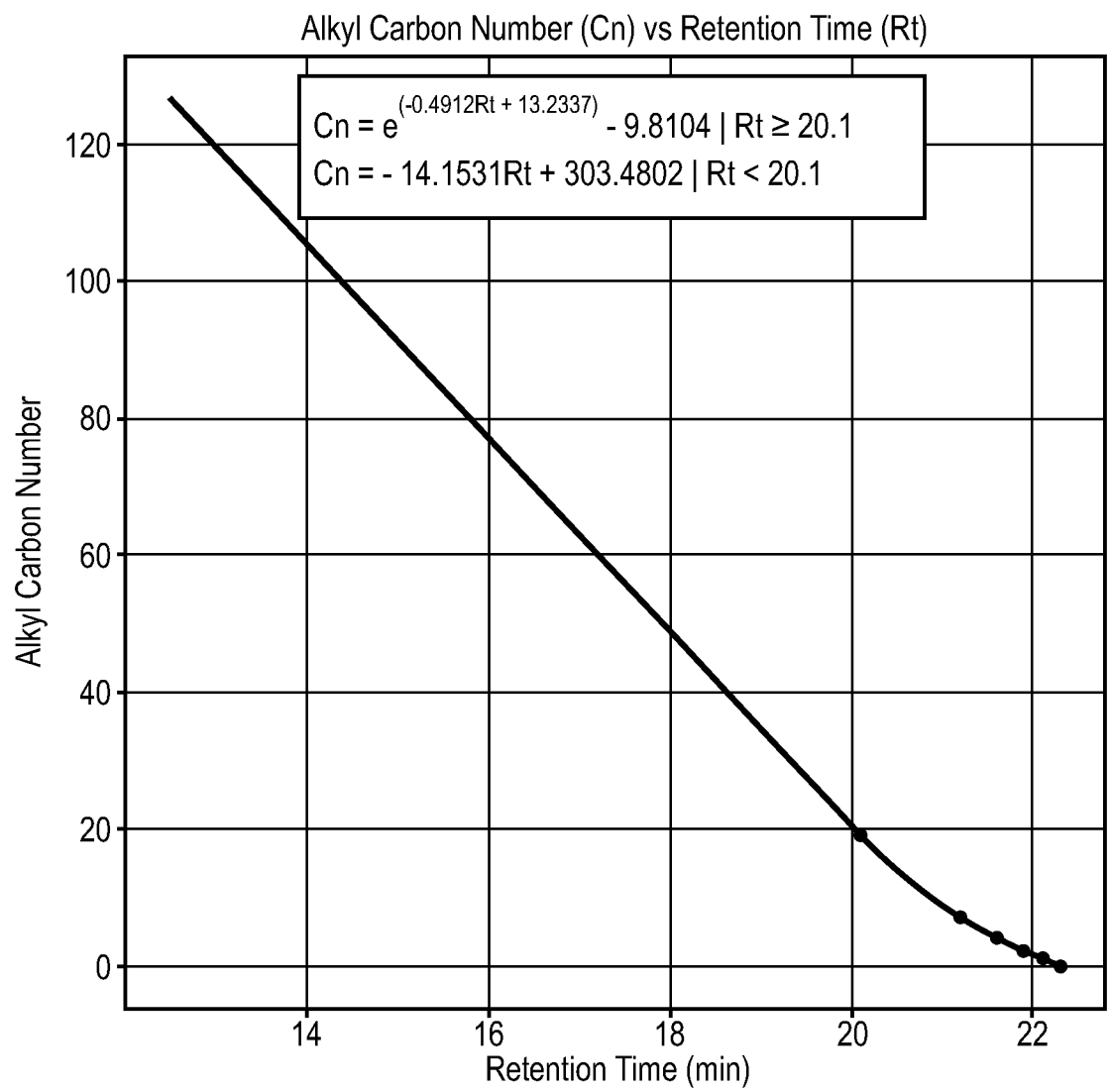
FIG. 7 depicts a plot of carbon number of an alkyl substituent as a function of retention time.

FIG. 6 depicts a flowchart of steps in a method 6000 that provides the carbon number of an alkyl substituent of an aromatic compound using a retention time (e.g., a GPC retention time) of the aromatic compound and a prediction model that includes a calibration curve of carbon number as a function of retention time. In step 6020, the retention times (Rt) of standard aromatic compounds are measured by size exclusion chromatography. The standard aromatic compounds include aromatic compounds with an alkyl substituent of varying length. In step 6030, a prediction model is constructed using the retention times from step 6020 and the carbon number of the alkyl substituent of the standard aromatic compounds. Such a model is depicted in FIG. 7, which is described in more detail below. In step 6040, the retention time of an unknown aromatic compound is measured by size exclusion chromatography. In step 6050, the retention time of the unknown sample measured in step 6040 and the prediction model from step 6030 are used to determine the carbon number of the alkyl substituent of the unknown aromatic compound. Like the first prediction model from the method 1000, the prediction model of step 6030 of the method 6000 can include a retention volume, retention factor or solute distribution coefficient rather than the retention time. The method 6000 can be used to validate the results from the method 1000.

The size exclusion chromatography performed in the steps 6020 and/or 6040 can correspond to the size exclusion chromatography performed in the steps 1020 and/or 1040, respectively. The standard aromatic compounds used in the step 6020 can correspond to the standard aromatic compounds used in the step 1020.

In the step 1060 and/or the step 6050, the carbon number distribution (alkyl range, as described below, or an interval that provides a desired area percentage), highest alkyl carbon number (corresponding to the retention time at the rising edge of a size exclusion chromatography peak), and/or alkyl carbon number of highest abundance (corresponding to the retention time at the peak maximum of a size exclusion chromatography peak) of aromatic compounds in a sample can be determined.

The method 1000 and/or 6000 can provide a percentage contribution of alkyl ranges (e.g. $C_1$-$C_5$, $C_6$-$C_{10}$, $C_{10}$-$C_{20}$, $C_{20}$-$C_{30}$, $C_{30}$-$C_{40}$, $C_{40}$-$C_{50}$, $C_{50}$-$C_{60}$, $C_{60}$-$C_{70}$, $C_{70}$-$C_{80}$, $C_{80}$-$C_{90}$, $C_{90}$-$C_{100}$, $C_{>100}$) with respect to a total amount of alkyl substituted-aromatic compounds in a sample.

The unknown samples can include one, two, three rings and/or more than three rings. The unknown aromatic compound(s) can be derived from naphtha, gas oil, vacuum gas oil, residue, crude oil, cracking products, and/or a petroleum sample.

A controller may be used for controlling and/or implementing a method disclosed herein (e.g., the method 1000 and/or 6000). The controller may be used to provide more robust process control and higher efficiency.

In some embodiments, the controller may be a separate unit mounted in the field or plant, such as a programmable logic controller (PLC), for example, as part of a supervisory control and data acquisition (SCADA) or Fieldbus network. In certain embodiments, the controller may interface to a distributed control system (DCS) installed in a central control center. In some embodiments, the controller may be a virtual controller running on a processor in a DCS, on a virtual processor in a cloud server, or using other real or virtual processors.

In some embodiments, the controller includes a processor. The processor may be a microprocessor, a multi-core processor, a multithreaded processor, an ultra-low-voltage processor, an embedded processor, or a virtual processor. The processor may be part of a system-on-a-chip (SoC) in which the processor and other components are formed into a single integrated package. In various embodiments, the processor may include processors from Intel® Corporation of Santa Clara, California, from Advanced Micro Devices, Inc. (AMD) of Sunnyvale, California, or from ARM holdings, LTD., of Cambridge England. Any number of other processors from other suppliers may also be used.

In some embodiments, the processor may communicate with other components of the controller over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus technologies may be used, in addition to, or instead of, the technologies above. For example, plant interface systems may include I2C buses, serial peripheral interface (SPI) buses, Fieldbus, and the like.

In some embodiments, the bus may couple the processor to a memory. In some embodiments, such as in PLCs and other process control units, the memory is integrated with a data store used for long-term storage of programs and data. The memory includes any number of volatile and nonvolatile memory devices, such as volatile random-access memory (RAM), static random-access memory (SRAM), flash memory, and the like. In smaller devices, such as PLCs, the memory may include registers associated with the processor itself. The data store is used for the persistent storage of information, such as data, applications, operating systems, and so forth. The data store may be a nonvolatile RAM, a solid-state disk drive, or a flash drive, among others. In some embodiments, the data store will include a hard disk drive, such as a micro hard disk drive, a regular hard disk drive, or an array of hard disk drives, for example, associated with a DCS or a cloud server.

In some embodiments, the bus couples the controller to a controller interface. The controller interface may be an interface to a plant bus, such as a Fieldbus, an I2C bus, an SPI bus, and the like. The controller interface couples the controller to an HPLC to provide retention time data and/or a system (e.g., a computer) to provide molecular modeling data.

In some embodiments, a controller interface couples the controller to a HPLC to provide retention time data. The interface may be an interface to a plant bus, such as a Fieldbus, an I2C bus, an SPI bus, and the like.

If the controller is located in the field, a local human machine interface (HMI) may be used to input control parameters. The local HMI may be coupled to a user interface, including, for example, a display that includes a multiline LCD display, or a display screen, among others. The user interface may also include a keypad for the entry of control parameters, such as parameters for the operation of the HPLC. Generally, the controller will either be part of a plant control system, such as a DCS, or coupled through a plant bus system to the plant control system.

In some embodiments, the controller is linked to a control system for the assay through a network interface controller (NIC). The NIC can be an Ethernet interface, a wireless network interface, or a plant bus interface, such as Fieldbus.

In some embodiments, the data store includes blocks of stored instructions that, when executed, direct the processor to implement the control functions for the method(s). In some embodiments, the data store includes a block of instructions to direct the processor to collect data through the interface.

In some embodiments, the data store also includes a block of instructions to direct the processor to calculate one or more parameters from the molecular modeling and/or HPLC data. Any number of blocks may be included in the data store to implement the various functions and/or steps of the method(s) disclosed herein. Such blocks can be used individually or in combination as appropriate.

EXAMPLES

Example 1—Construction of Prediction Models

Gel permeation chromatographic separations were carried out using an Agilent 1200 high performance liquid chromatograph (HPLC) including a binary pump, a degasser, an autosampler, and a diode array detector set to record UV spectra from 200 nm to 400 nm. Instrument control, data recording, and data analyses were performed using Agilent Chemstation software. The method parameters are presented in Table 1.

TABLE 1

| HPLC parameters | |
| --- | --- |
| Flow rate | 0.8 mL/min |
| Detector | DAD-UV detector (300 ± 200 nm) |
| Injection volume | 2 µL |
| Run time | 30 minutes |
| Mobile phase | Dichloromethane |
| Column | Two HPLC columns (250 mm × 8 mm) packed with Eurospher II 100-5 $NH_2$ connected in series (Average particle size and pore size of silica gel 5 µm and 100 Å, respectively) |
| Column oven temperature | 30° C. |

A series of standards: benzene (BZ), toluene (BZ-C1), ethyl benzene (BZ-C2), butyl benzene (BZ-C4), heptyl benzene (BZ-C7), and nonadecyl benzene (BZ-C19), were analyzed and the retention time (Rt) of each standard was recorded. Molecular length (Lm) and molecular volume (Vm) of the geometrically optimized molecular structures were calculated using $Dmol^3$ molecular modeling program in the Materials Studio software package version 2019. The recorded Rt, Lm and Vm of each standard aromatic compound is presented in Table 2.

TABLE 2

| Retention time and molecular dimension of standard aromatic compounds | | | | |
| --- | --- | --- | --- | --- |
| Compounds | Abbreviated name | Rt (min) | Lm (Å) | Vm (Å$^3$) |
| Benzene | BZ-C0 | 22.3 | 4.977 | 85.05 |
| Toluene | BZ-C1 | 22.1 | 5.909 | 96.48 |
| Ethyl benzene | BZ-C2 | 21.9 | 7.21 | 119.97 |
| Butyl benzene | BZ-C4 | 21.6 | 9.595 | 155.38 |
| Heptyl benzene | BZ-C7 | 21.2 | 13.259 | 202.55 |
| Nonadecyl benzene | BZ-C19 | 20.1 | 28.521 | 411.1 |

Prediction models of Lm as a function of Rt and Vm as a function of Rt of the standard aromatic compounds were generated using a multiple curve fitting algorithm, as shown in FIGS. 2 and 3, respectively. Machine learning algorithms were used to optimize the prediction models.

Lm as a function of Rt of the known aromatic compounds (FIG. 2) was not linear so a best fit was calculated using an exponential curve fit function for Rt>=20.1 and a linear curve fit for Rt<20.1 for better prediction, as shown in equations (4)

$$Lm = \begin{cases} e^{(-0.5502Rt+14.5776)} - 5.2185, & Rt \geq 20.1 \\ 18.5673Rt + 401.732, & Rt < 20.1 \end{cases} \quad (4)$$

where Rt is the retention time.

Vm as a function of Rt of the known aromatic compounds (FIG. 3) was not linear so a best fit was calculated using an exponential curve fit function for Rt>=20.1 and a linear curve fit for Rt<20.1 for better prediction, as shown in equations (5)

$$Vm = \begin{cases} e^{(-0.4881Rt+16.0226)} - 87.2529, & Rt \geq 20.1 \\ -243.2241Rt + 5299.8268, & Rt < 20.1 \end{cases} \quad (5)$$

where Rt is the retention time.

A supplementary prediction model of alkyl carbon number ($C_n$) as a function of Rt was constructed using both exponential and linear curve fitting algorithm as shown in FIG. 7. The alkyl carbon number as a function of Rt of the known aromatic compounds was not linear so a best fit was calculated using an exponential curve fit function for Rt>=20.1 and a linear curve fit for Rt<20.1 for better prediction, as shown in equations (6)

$$Cn = \begin{cases} e^{(-0.4912Rt+13.2337)} - 9.8104, & Rt \geq 20.1 \\ -14.1531Rt + 303.4802, & Rt < 20.1 \end{cases} \quad (6)$$

where Rt is the retention time.

The Lm and Vm of a series of aromatic compounds were determined using Dmol³ and the Rt of the compounds were determined using the prediction models of FIGS. 2, 3 and 7 (Lm as a function of Rt, Vm as a function of Rt, and alkyl carbon number as a function of Rt) and presented in Table 3, with retention times in minutes (min). The coefficient of determination ($R^2$) for the prediction models of FIGS. 2, 3 and 7 were $R^2$=0.99989, $R^2$=0.99956 and $R^2$=0.99996, respectively.

TABLE 3

Predicted retention time for different compounds

| Compound | Lm (Å) | Vm (Å³) | Alkyl carbon number | Rt (min, based on Lm) | Rt (min, based on Vm) | Rt (min, based on alkyl carbon number) |
|---|---|---|---|---|---|---|
| BZ | 4.977 | 85.05 | 0 | 22.3 | 22.3 | 22.3 |
| BZ-C1 | 5.909 | 96.48 | 1 | 22.1 | 22.1 | 22.1 |
| BZ-C2 | 7.21 | 119.97 | 2 | 21.9 | 21.9 | 21.9 |
| BZ-C4 | 9.595 | 155.38 | 4 | 21.6 | 21.6 | 21.6 |
| BZ-C5 | 10.304 | 168.56 | 5 | 21.5 | 21.5 | 21.5 |
| BZ-C7 | 13.259 | 202.55 | 7 | 21.2 | 21.2 | 21.2 |
| BZ-C10 | 17.116 | 250.40 | 10 | 20.9 | 20.9 | 20.9 |
| BZ-C14 | 22.21 | 322.47 | 14 | 20.5 | 20.5 | 20.5 |
| BZ-C15 | 23.467 | 338.03 | 15 | 20.4 | 20.4 | 20.4 |
| BZ-C19 | 28.521 | 411.1 | 19 | 20.1 | 20.1 | 20.1 |
| BZ-C20 | 29.86 | 423.62 | 20 | 20.0 | 20.0 | 20.0 |
| BZ-C25 | 36.177 | 501.8 | 25 | 19.7 | 19.7 | 19.7 |
| BZ-C30 | 42.624 | 586.92 | 30 | 19.3 | 19.4 | 19.3 |
| BZ-C35 | 49.097 | 671.78 | 35 | 19.0 | 19.0 | 19.0 |
| BZ-C40 | 55.363 | 753.13 | 40 | 18.7 | 18.7 | 18.6 |
| BZ-C45 | 61.791 | 851.02 | 45 | 18.3 | 18.3 | 18.3 |
| BZ-C50 | 68.233 | 932.72 | 50 | 18.0 | 17.9 | 17.9 |
| BZ-C60 | 80.929 | 1098.85 | 60 | 17.3 | 17.2 | 17.2 |
| BZ-C70 | 93.783 | 1274.04 | 70 | 16.6 | 16.5 | 16.5 |
| BZ-C100 | 132.368 | 1771.84 | 100 | 14.5 | 14.4 | 14.4 |

Prediction models of alkyl carbon number ($C_n$) as a function of Lm and alkyl carbon number as a function of Vm were generated using a linear fit of the compounds of Table 3, as shown in FIGS. 4 and 5, respectively. The fits for the prediction models of FIGS. 4 and 5 are shown in equations (7) and (8), respectively.

$$\text{Alkyl carbon number} = 0.7831 Lm - 3.4403 \quad (7)$$

$$\text{Alkyl carbon number} = 0.0591 Vm - 4.9683 \quad (8)$$

Example 2—Determination of Carbon Number of Alkyl Substituent in a Distilled Cut Sample A weighed sample of 15 L of stabilized crude was distilled to a maximum temperature of 566° C. (atmospheric equivalent temperature). The sample was distilled into 10 discrete fractions at predetermined cut points (shown in Table 4). Cuts 1 to 7 were obtained according to ASTM D2892 and cuts 8, 9 and 10 were collected according to ASTM D5236. Cut 7 was used as a distilled cut sample.

TABLE 4

Boiling temperatures of distilled cuts

| Distilled cuts and residue | Boiling temperature (atmospheric equivalent, ° C.) |
|---|---|
| Cut 1 | $C_1$ to $C_4$ light gases |
| Cut 2 | Room temperature-93 |
| Cut 3 | 93-157 |
| Cut 4 | 157-204 |
| Cut 5 | 204-260 |
| Cut 6 | 260-316 |
| Cut 7 | 316-371 |
| Cut 8 | 371-427 |
| Cut 9 | 427-482 |
| Cut 10 | 482-566 |
| Residue | >566 |

Figure 8:
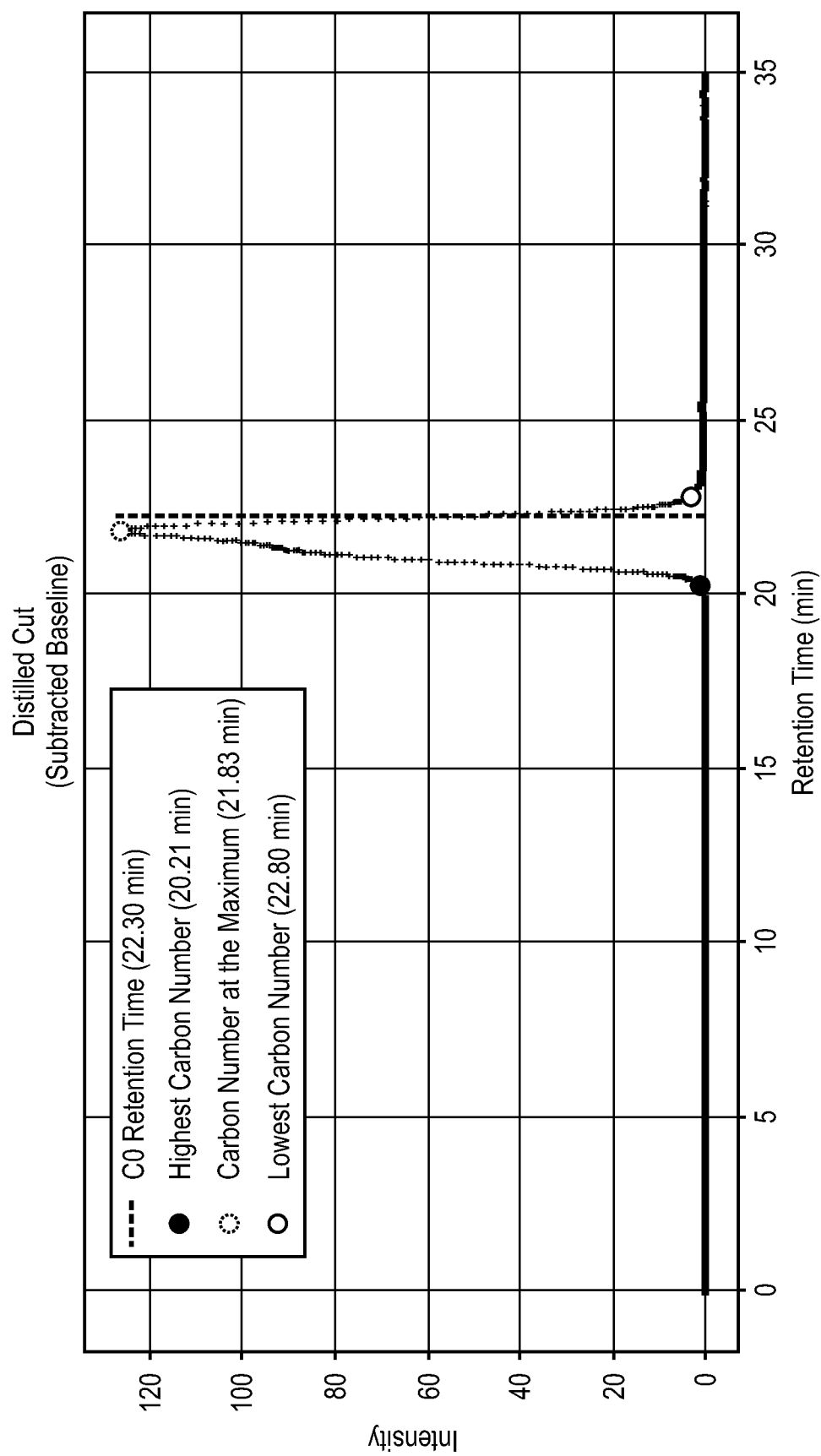
FIG. 8 depicts a baseline corrected plot of the sample intensity as a function of retention time of a distilled cut sample.

The retention time of the distilled cut sample was measured by HPLC as described in Example 1. FIG. 8 shows a baseline corrected plot of the sample intensity as a function of retention time.

Figure 9:
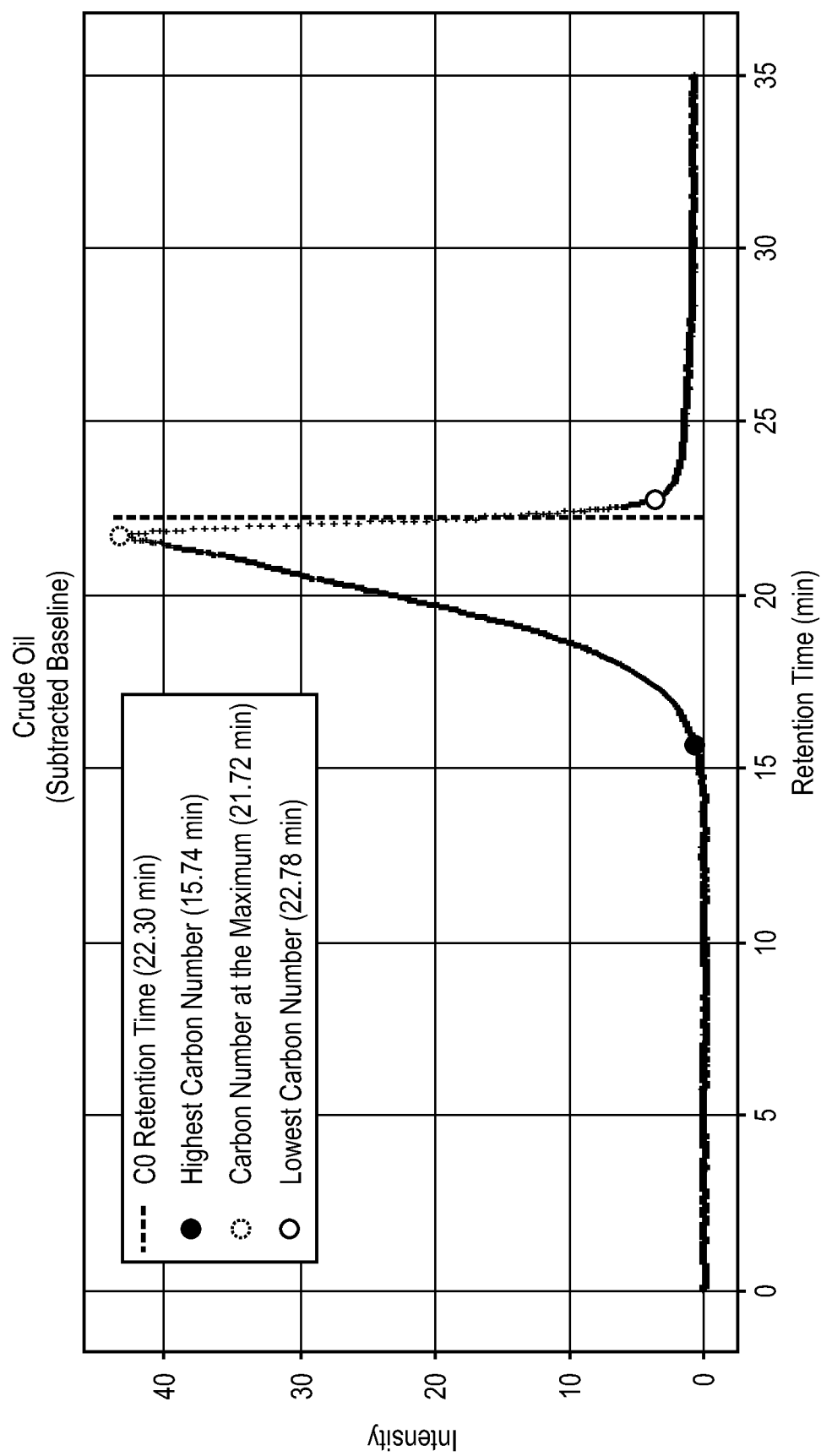
FIG. 9 depicts a baseline corrected plot of the sample intensity as a function of retention time of a crude oil sample.
Figure 10:
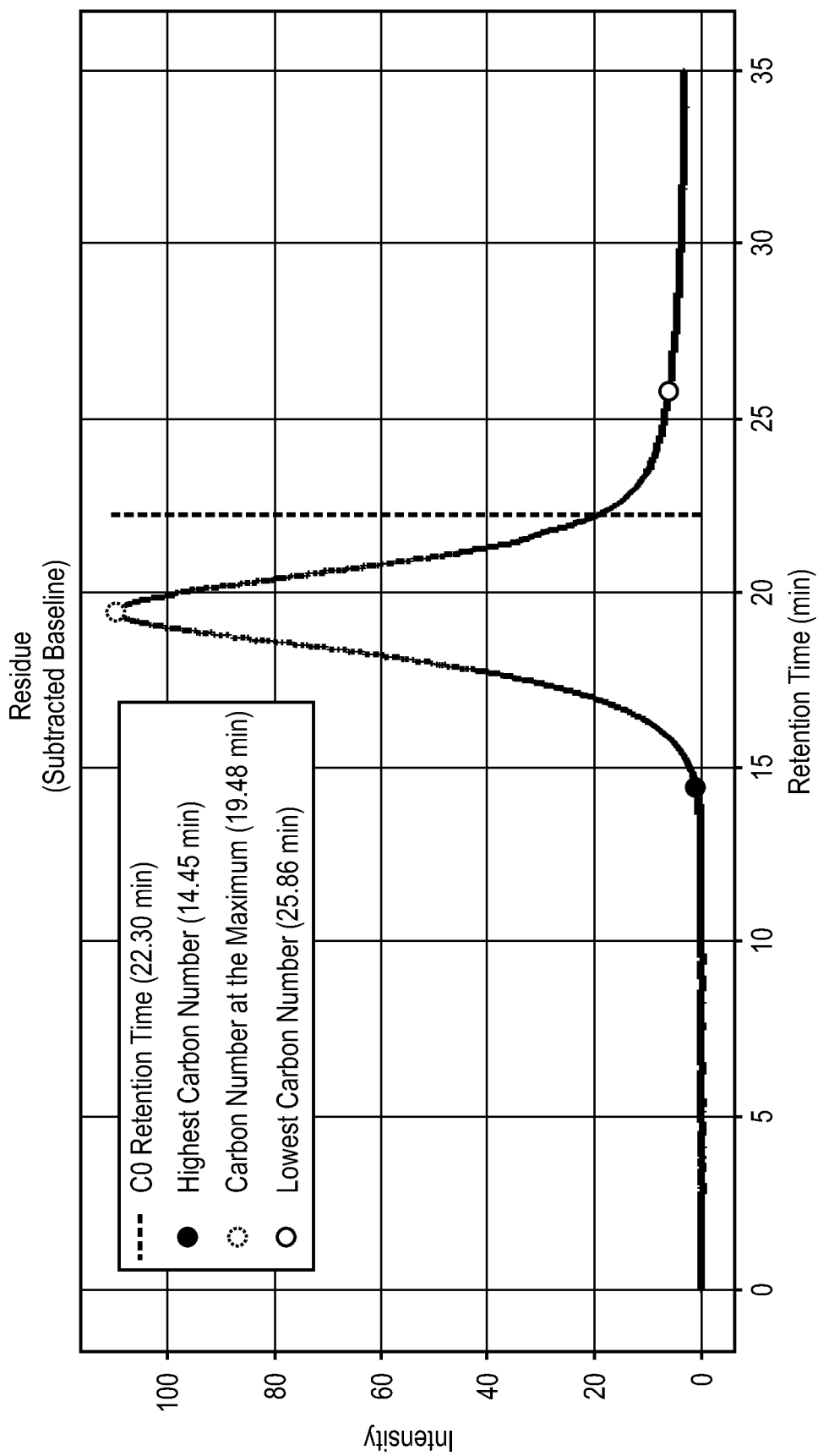
FIG. 10 depicts a baseline corrected plot of the sample intensity as a function of retention time of a residue sample.

The rising edge, corresponding to a highest carbon number (black dot, as shown in FIGS. 8-10) and falling edge, corresponding to a lowest carbon number (white dot with solid outline, as shown in FIGS. 8-10) of the curve was determined using user provided rising edge and falling edge intensity thresholds, 0.01 and 0.02 respectively, for the distilled cut sample. After the location of the rising edge was determined, data prior to the rising edge was used to determine the baseline using linear regression on all points prior to the rising edge. Next, the intensities below the baseline were subtracted from the signal, thereby providing a normalized chromatogram. The point corresponding to maximum intensity of the peak (dot with dashed outline, as shown in FIGS. 8-10) represented carbon number of the alkyl substituent at the maximum intensity. C0 corresponds to the retention time for benzene.

Table 5 shows the measured Rt, calculated Lm and Vm and the estimated alkyl carbon number of the distilled cut sample from the prediction models of Example 1 using the three methods (Lm and FIGS. 2 and 4, Vm and FIGS. 3 and 5, and FIG. 7). The alkyl carbon number results obtained from the three methods were nearly identical.

TABLE 5

Estimated alkyl carbon number of a distilled cut from three prediction models

|  | Retention Time (Rt) | Molecular Length (Lm) | Molecular Volume (Vm) | C_Lm | C_Vm | C_Rt |
|---|---|---|---|---|---|---|
| Carbon number at the maximum | 21.83 | 7.83 | 127.13 | 2.7 | 2.5 | 2.5 |
| Highest carbon number | 20.21 | 26.47 | 384.33 | 17.3 | 17.8 | 17.4 |

C_Lm: Carbon Number by Molecular Length (FIGS. 2 and 4)
C_Vm: Carbon Number by Molecular Volume (FIGS. 3 and 5)
C_Rt: Carbon Number by Retention Time (FIG. 7)

Example 3—Determination of Carbon Number of Alkyl Substituent in a Crude Oil Sample The retention time of a crude oil sample was measured by HPLC as described in Example 1. FIG. 9 shows a baseline corrected plot of the sample intensity as a function of retention time. The baseline correction was performed as described in Example 2 with rising edge and falling edge intensity thresholds of 0.01 and 0.02, respectively.

Table 6 shows the measured Rt, calculated Lm and Vm and the estimated alkyl carbon number of the crude oil sample from the prediction models of Example 1 using the three methods (Lm and FIGS. 2 and 4, Vm and FIGS. 3 and 5, and FIG. 7). The alkyl carbon number results obtained from the three methods were nearly identical.

TABLE 6

Estimated alkyl carbon number of a crude oil from three prediction models

|  | Retention Time (Rt) | Molecular Length (Lm) | Molecular Volume (Vm) | C_Lm | C_Vm | C_Rt |
|---|---|---|---|---|---|---|
| Carbon number at the maximum | 21.72 | 8.65 | 139.05 | 3.3 | 3.3 | 3.2 |
| Highest carbon number | 15.74 | 109.42 | 1455.06 | 82.2 | 81.1 | 80.7 |

C_Lm: Carbon Number by Molecular Length (FIGS. 2 and 4)
C_Vm: Carbon Number by Molecular Volume (FIGS. 3 and 5)
C_Rt: Carbon Number by Retention Time (FIG. 7)

Example 4—Determination of Carbon Number of Alkyl Substituent in a Residue Sample The sample from Example 2 was distilled to obtain a residue sample. The retention time of the residue sample was measured by HPLC as described in Example 1. FIG. 9 shows a baseline corrected plot of the sample intensity as a function of retention time. The baseline correction was performed as described in Example 2 with rising edge and falling edge intensity thresholds of 0.01 and 0.02, respectively.

Table 7 shows the measured Rt, calculated Lm and Vm and the estimated alkyl carbon number of the residue sample from the prediction models of Example 1 using the three methods (Lm and FIGS. 2 and 4, Vm and FIGS. 3 and 5, and FIG. 7). The alkyl carbon number results obtained from the three methods were nearly identical.

TABLE 7

Estimated alkyl carbon number of a residue from three prediction models

|  | Retention Time (Rt) | Molecular Length (Lm) | Molecular Volume (Vm) | C_Lm | C_Vm | C_Rt |
|---|---|---|---|---|---|---|
| Carbon number at the maximum | 19.48 | 40.10 | 560.38 | 28.0 | 28.2 | 27.8 |
| Highest carbon number | 14.45 | 133.43 | 1764.94 | 101.0 | 99.4 | 99.0 |

C_Lm: Carbon Number by Molecular Length (FIGS. 2 and 4)
C_Vm: Carbon Number by Molecular Volume (FIGS. 3 and 5)
C_Rt: Carbon Number by Retention Time (FIG. 7)

What is claimed:

1. A method of determining a carbon number of an alkyl substituent of an aromatic compound, the method comprising:
    using chromatography to measure a retention time of the aromatic compound;
    determining a physical parameter of the aromatic compound using the measured retention time of the aromatic compound and a first prediction model comprising a calibration curve of the physical parameter as a function of retention time or a parameter derived from the retention time; and
    determining a carbon number for the alkyl substituent of the aromatic compound using the physical parameter of the aromatic compound and a second prediction model comprising a calibration curve of the carbon number of the alkyl substituent as a function of the physical parameter.

2. The method of claim 1, wherein:
    the physical parameter comprises a molecular length of the aromatic compound;
    the first prediction model comprises a calibration curve of the molecular length as a function of retention time; and
    the second prediction model comprises a calibration curve of the carbon number for the alkyl substituent as a function of molecular length.

3. The method of claim 1, wherein:
    the physical parameter comprises a molecular volume of the aromatic compound;
    the first prediction model comprises a calibration curve of molecular volume as a function of retention time; and
    the second prediction model comprises a calibration curve of the carbon number for the alkyl substituent as a function of molecular volume.

4. The method of claim 1, wherein:
    the aromatic compound has a retention volume ($R_v$) calculated as:

$R_v = R_t \times$ flow rate a of mobile phase used in the chromatography;

wherein $R_t$ is the retention time of the aromatic compound;
    the physical parameter comprises a molecular length of the aromatic compound;
    the first prediction model comprises a calibration curve of the molecular length as a function of retention volume; and
    the second prediction model comprises a calibration curve of the carbon number for the alkyl substituent as a function of molecular length.

5. The method of claim 1, wherein:
    the aromatic compound has a retention volume ($R_v$) calculated as:

$R_v = R_t \times$ flow rate of a mobile phase used in the chromatography;

wherein $R_t$ is the retention time of the aromatic compound;
    the physical parameter comprises a molecular volume of the aromatic compound;
    the first prediction model comprises a calibration curve of the molecular volume as a function of retention volume; and
    the second prediction model comprises a calibration curve of the carbon number for the alkyl substituent as a function of molecular volume.

6. The method of claim 1, wherein:
    the aromatic compound has a solute distribution coefficient ($K_{dis}$) calculated as:

$$K_{Dis} = \frac{\text{Retention volume of aromatic compound} - \text{elution volume of a high } MW \text{ polystyrene standard}}{\text{Retention volume of benzene} - \text{elution volume of a high } MW \text{ polystyrene standard}};$$

the physical parameter comprises a molecular length of the aromatic compound;
    the first prediction model comprises a calibration curve of the molecular length as a function of solute distribution coefficient; and
    the second prediction model comprises a calibration curve of the carbon number for the alkyl substituent as a function of molecular length.

7. The method of claim 1, wherein:
    the aromatic compound has a solute distribution coefficient ($K_{dis}$) calculated as:

$$K_{Dis} = \frac{\text{Retention volume of aromatic compound} - \text{elution volume of a high } MW \text{ polystyrene standard}}{\text{Retention volume of benzene} - \text{elution volume of a high } MW \text{ polystyrene standard}};$$

the physical parameter comprises a molecular volume of the aromatic compound;
    the first prediction model comprises a calibration curve of the molecular volume as a function of solute distribution coefficient; and
    the second prediction model comprises a calibration curve of the carbon number for the alkyl substituent as a function of molecular volume.

8. The method of claim 1, wherein the first prediction model is constructed by measuring retention times of standard aromatic compounds and calculating the physical parameter for the standard aromatic compounds.

9. The method of claim 1, wherein the carbon number for the alkyl substituent of the aromatic compound comprises at least one member selected from the group consisting of an alkyl carbon number distribution, a highest alkyl carbon number, and an alkyl carbon number of highest abundance.

10. The method of claim 1, wherein at least one of the following holds:
the retention time is measured using size exclusion chromatography; and
the physical parameter is measured by molecular modeling.

11. The method of claim 1, wherein the aromatic compound comprises at least one member selected from the group consisting of an aromatic compound with one ring, an aromatic compound with two rings, an aromatic compound with three rings, and an aromatic compound with more than three rings.

12. The method of claim 1, wherein the aromatic compound is derived from a member selected from the group consisting of naphtha, gas oil, vacuum gas oil, residue, crude oil, cracking products, and a petroleum sample.

13. One or more machine-readable hardware storage devices comprising instructions that are executable by one or more processing devices to perform operations comprising the method of claim 1.

14. A system comprising:
one or more processing devices; and
one or more machine-readable hardware storage devices comprising instructions that are executable by the one or more processing devices to perform operations comprising the method of claim 1.

15. A method of determining a carbon number of an alkyl substituent of an aromatic compound, the method comprising:

using chromatography to measure a retention time of the aromatic compound; and determining a carbon number for the alkyl substituent of the aromatic compound using the measured retention time for the aromatic compound and a prediction model comprising a calibration curve of the carbon number of the alkyl substituent as a function of the retention time or a parameter derived from the retention time.

16. The method of claim 15 wherein the carbon number for the alkyl substituent of the aromatic compound comprises at least one member selected from the group consisting of an alkyl carbon number distribution, a highest alkyl carbon number, and an alkyl carbon number of highest abundance.

17. The method of claim 15, wherein the aromatic compound comprises at least one member selected from the group consisting of an aromatic compound with one ring, an aromatic compound with two rings, an aromatic compound with three rings, and an aromatic compound with more than three rings.

18. The method of claim 15, wherein the aromatic compound is derived from a member selected from the group consisting of naphtha, gas oil, vacuum gas oil, residue, crude oil, cracking products, and a petroleum sample.

19. One or more machine-readable hardware storage devices comprising instructions that are executable by one or more processing devices to perform operations comprising the method of claim 15.

20. A system comprising:
one or more processing devices; and
one or more machine-readable hardware storage devices comprising instructions that are executable by the one or more processing devices to perform operations comprising the method of claim 15.

* * * * *